(12) United States Patent
Tomas

(10) Patent No.: US 12,473,944 B2
(45) Date of Patent: Nov. 18, 2025

(54) ENHANCED BALL JOINT WITH ROTATION SENSOR

(71) Applicant: O.C.A.P. S.P.A., Valperga (IT)

(72) Inventor: Jean-Jacques Tomas, Caselle Torinese (IT)

(73) Assignee: O.C.A.P. S.P.A., Valperga (IT)

( * ) Notice: Subject to any disclaimer, the term of this patent is extended or adjusted under 35 U.S.C. 154(b) by 712 days.

(21) Appl. No.: 17/758,814

(22) PCT Filed: Jan. 8, 2021

(86) PCT No.: PCT/IB2021/050125
§ 371 (c)(1),
(2) Date: Jul. 14, 2022

(87) PCT Pub. No.: WO2021/148899
PCT Pub. Date: Jul. 29, 2021

(65) Prior Publication Data
US 2023/0041591 A1 Feb. 9, 2023

(30) Foreign Application Priority Data
Jan. 22, 2020 (IT) .......................... 102020000001189

(51) Int. Cl.
*F16C 11/06* (2006.01)
*G01D 5/02* (2006.01)
*G01D 5/14* (2006.01)

(52) U.S. Cl.
CPC ...... *F16C 11/0604* (2013.01); *F16C 11/0642* (2013.01); *G01D 5/02* (2013.01); *G01D 5/14* (2013.01); *F16C 2233/00* (2013.01)

(58) Field of Classification Search
CPC .............. F16C 11/0642; F16C 11/0604; F16C 2233/00; B62D 15/023; G01D 5/02; G01D 5/14; B60G 2204/11; B60G 2204/416
See application file for complete search history.

(56) References Cited

U.S. PATENT DOCUMENTS 4,662,772 A * 5/1987 Schultz ............... F16C 11/0609
403/114
6,879,240 B2 * 4/2005 Kruse .................. B60G 17/019
338/12
(Continued)

FOREIGN PATENT DOCUMENTS

CN 207578443 U 7/2018
EP 1726512 A1 11/2006
(Continued)

OTHER PUBLICATIONS

International Search Report and Written Opinion for Corresponding International Application No. PCT/IB2021/050125, 9 pages, Apr. 12, 2021.

*Primary Examiner* — Matthew R McMahon
(74) *Attorney, Agent, or Firm* — LUCAS & MERCANTI, LLP

(57) ABSTRACT

A ball joint contains a body and a pin having a first threaded end and a second spherical end which is rotatably arranged within a seat of the body. The pin cooperates with a first spherical-cap-shaped element inserted within a further seat having a corresponding shape of a second spherical-cap-shaped element cooperating with a covering element to close the spherical end of the pin within the body. The second spherical end of the pin and the first and second spherical-cap-shaped elements include pairs of recesses and ridges in the contact areas for reciprocally compenetrating, the pairs of recesses and ridges being arranged at 90° to each other to (Continued)

allow rotation of the pin along all axes in the body. An angular movement sensor integral with the body of the joint cooperates with the second spherical-cap-shaped element to detect rotation of the pin.

7 Claims, 4 Drawing Sheets

(56)  References Cited

U.S. PATENT DOCUMENTS

| | | | | |
|---|---|---|---|---|
| 7,762,736 | B2 * | 7/2010 | Ersoy | B60D 1/30 |
| | | | | 403/132 |
| 9,831,819 | B2 * | 11/2017 | Kirk | F24S 25/10 |
| 10,626,914 | B2 * | 4/2020 | Nishinakama | H03K 17/97 |
| 2011/0204881 | A1 * | 8/2011 | Spratte | F16C 11/0604 |
| | | | | 324/207.13 |
| 2023/0175637 | A1 * | 6/2023 | Mazur | F16C 11/0647 |
| | | | | 248/127 |

FOREIGN PATENT DOCUMENTS

| | | | |
|---|---|---|---|
| EP | 2567668 A1 | 3/2013 | |
| WO | 2016147067 A1 | 9/2016 | |
| WO | WO-2018033322 A1 * | 2/2018 | ......... F16C 11/0604 |

\* cited by examiner

ENHANCED BALL JOINT WITH ROTATION SENSOR

CROSS-REFERENCE TO RELATED APPLICATIONS

This application is a 371 of PCT/IB2021/050125, filed Jan. 8, 2021, which claims the benefit of Italian Patent Application No. 102020000001189, filed Jan. 22, 2020.

FIELD OF THE INVENTION

The present invention relates to an enhanced ball joint according to the preamble of the main claim.

BACKGROUND OF THE INVENTION

It is known that ball joints allow for a relative rotation between two components of a suspension along the three axes in the space, thus providing three independent rotational degrees of freedom.

The main problem affecting the use of such joints is mainly in that the angles of rotation around the axes of the joint (in particular around the Z axis in the space, i.e. the longitudinal axis of the joint itself) are difficult to measure, which is very important for some applications. For instance, being able to measure the angle of rotation around the vertical axis (or Z axis) of the body, in order to be able to calculate the steering angle accurately, is fundamental in the development of self-driving vehicles.

Solutions are known relevant to joints the rotation of which around the Z axis in the space is measurable.

For example, patent document WO2016/147067 discloses a single-suspended-wheel steering system comprising a sensor device suitable for measuring the angle of rotation of its joint around the Z axis. In particular, this prior art patent discloses a joint defined by a group or assembly comprising a pin which extends about a pivot axis and comprises a spherical section inserted within the body or rotation device, which is placed within an external bearing element, suitable for only allowing for a rotation of the complete body around the Z axis. The pin is crossed by a cylindrical plug, passing through the center of rotation, the purpose of which is to allow for oscillation movement about the X and Y axes and to prevent the movements of rotation of the pin around the Z axis. An angular sensor measures the rotation between the body and the bearing seat.

Such solution, even though allowing to evaluate the rotation of a joint around the Z axis, possibly presents criticalities in terms of workability of the pin for inserting the plug, assembling of numerous component parts, and excessive overall dimensions of the joint due to the presence of a bearing element external to the body wherein the pin rotates.

Patent document EP1726512 discloses a steering angle sensor associated with a joint of a wheel suspension of a vehicle. According to this prior art patent, the joint comprises a pin, a spherical end of which is associated with an upper cross element of the steering and is suitable for rotating around a vertical or Z axis in the space. The upper end of the spherical section of the pin includes the opening of a recess having a truncated-cone shape, extending up to the center of such section. A drive shaft is hinged in this point and makes it possible for the pin to oscillate around the X and Y axes, said shaft being driven into rotation around the Z axis and allowing for its angular measuring. The opposite end of the shaft is integral with the rotor of an external angular sensor secured to a body of the joint.

This known solution, even though allowing for an angular measurement of the rotation of the joint around the Z axis, is affected by problems related to a possible weakening of the spherical section because of the presence of the conical cavity, to the accuracy necessary for machining the pin, and to the tight tolerances on the coupling between the joint, the drive shaft, and the sensor.

SUMMARY OF THE INVENTION

An object of the present invention is to provide a ball joint whereby it is possible to measure the angle of rotation according to the Z axis in the space, i.e. around a longitudinal axis of the pin of the joint.

In particular, an object of this invention is to provide a joint of the mentioned type that is compact and easier to implement as compared to the known joints.

Another object is to provide a joint that is less subject to wear and tear as compared to the known solutions and does not require substantial modifications in its configuration as compared to the already known solutions, but at the same time is not equipped with complex instruments suitable for performing angular measurements, so as to allow for an immediate integration thereof with the remaining components of the mechanical element, for example a suspension, which it is a component part of.

These objects and others are achieved by a ball joint according to the attached claims.

BRIEF DESCRIPTION OF THE DRAWINGS

The following drawings are attached for mere explanatory, non-limitative purposes, for a better understanding of the present invention, wherein.

DETAILED DESCRIPTION OF THE INVENTION

Figure 1:
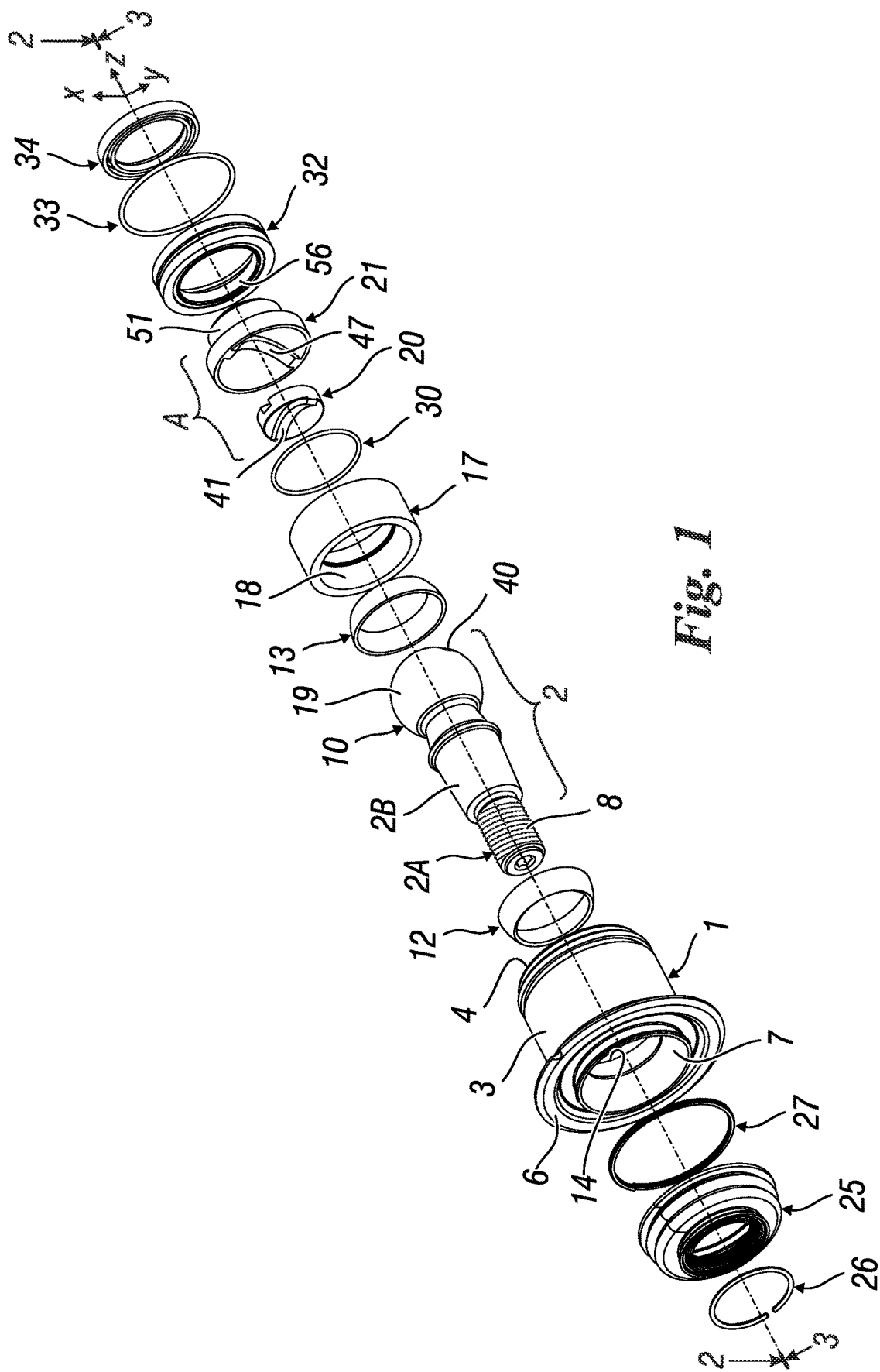
FIG. 1 shows an exploded view of a ball joint according to the invention.
Figure 2:
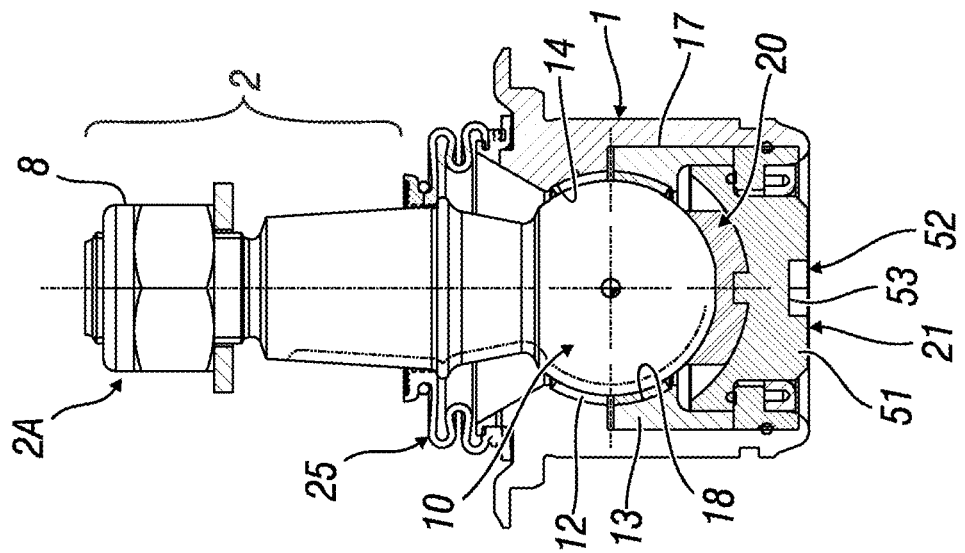
FIG. 2 shows a cross-sectional view according to line 2-2 in FIG. 1.
Figure 3:
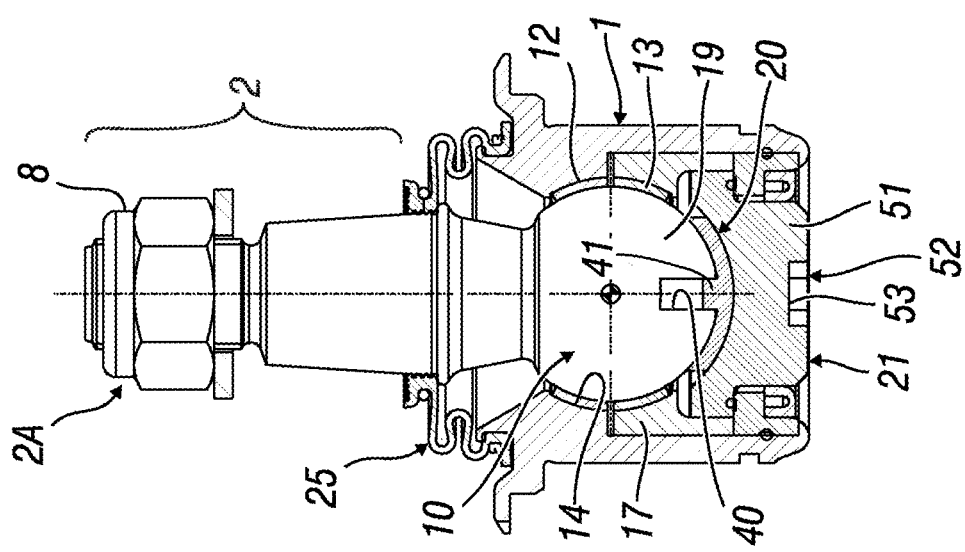
FIG. 3 shows a cross-sectional view according to line 3-3 in FIG. 1.

With reference to the mentioned figures, a ball joint comprises a body 1 and a pin 2 coupled with each other. The body 1 features a bowl shape and comprises a cylindrical portion 3 open at one first end 4; the body 1 includes an annular section 6 at the second end of the portion 3, delimitating a hole 7.

A rod 2A and a cone-shaped section 2B of the pin 2 cross the hole 7; such pin features a first threaded end 8 and a second spherical end 10. The latter is enclosed between a first and second covering elements 12 and 13 having the shape of a spherical segment or zone complementary to said second end and opposed to each other; the spherical end 10 is placed within a cylindrical portion 3 which comprises a spherical-cap-shaped inner seat 14, the first covering element 12 being arranged between said seat 14 and the end 10. The second covering element 13 is interposed between said spherical end 10 and an externally cylindrical washer 17, also having a spherical-cap-shaped inner seat 18.

A first spherical-cap-shaped shell 20 is inserted in the washer and on a portion or spherical cap 19 of the spherical end 10 of the pin 2 and is in turn inserted within a second shell 21, both arranged (together with the washer 17) internally to the body 1 of the joint.

A protective flexible cover 25 is associated with the body 1 in correspondence with the annular section 6, and annular seals 26 and 27 are associated therewith.

A further annular seal 30 is interposed between the body 1 and the washer 17; a cover or annular closing element 32 is finally present on said washer and on the second shell 21 to close the body of the joint 1 (secured to such body in a by-itself known manner and forming one containment element containing the spherical end 10 of the pin 2), all elements having been assembled by way of a plastic deformation of a usual dedicated section of the body 1. Finally, seals 33 and 34 are present in correspondence with said closing element 32.

A recess or groove 40 arranged along an Y axis in the space (see representations of the three axes in the space in FIG. 1) is derived in the spherical cap 19 of the spherical end 10 of the pin 2, suitable for co-operating with a ridge 41 projecting inside the first shell 20 (also arranged along the Y axis).

A recess or groove 46 arranged along the X axis, derived on an outer surface 43 of the first shell 20 (as referred to the pin 2), is suitable for co-operating with a corresponding ridge 47 provided on an inner surface of the second shell 21 (also arranged along the X axis).

The co-operations between said grooves 40 and 46 with their respective ridges 41 and 47 (coupled in a male-female relationship with each other) make it possible for the pin 2 to move in the body 1 of the joint. As a matter of fact, the co-operation between the groove 40 and the ridge 41 makes it possible to transmit a movement of rotation around the Z axis (i.e. the longitudinal axis of the pin 2) and the Y axis between the pin 2 and the first shell 20; all of this, a free rotation around the X axis being possible, thanks to such axis being positioned at an angle of 90° with respect to the groove 40 and to the ridge 41.

On the other hand, the co-operation between the groove 46 and the ridge 47 makes it possible to transmit a rotation movement around the Z axis (i.e. the longitudinal axis of the pin 2, hence of the ball joint) and around the X axis between the first and second shells 20 and 21, a free rotation around the Y axis being possible, thanks to this axis being arranged at 90° with respect the groove 46 and the ridge 47.

Figure 4:
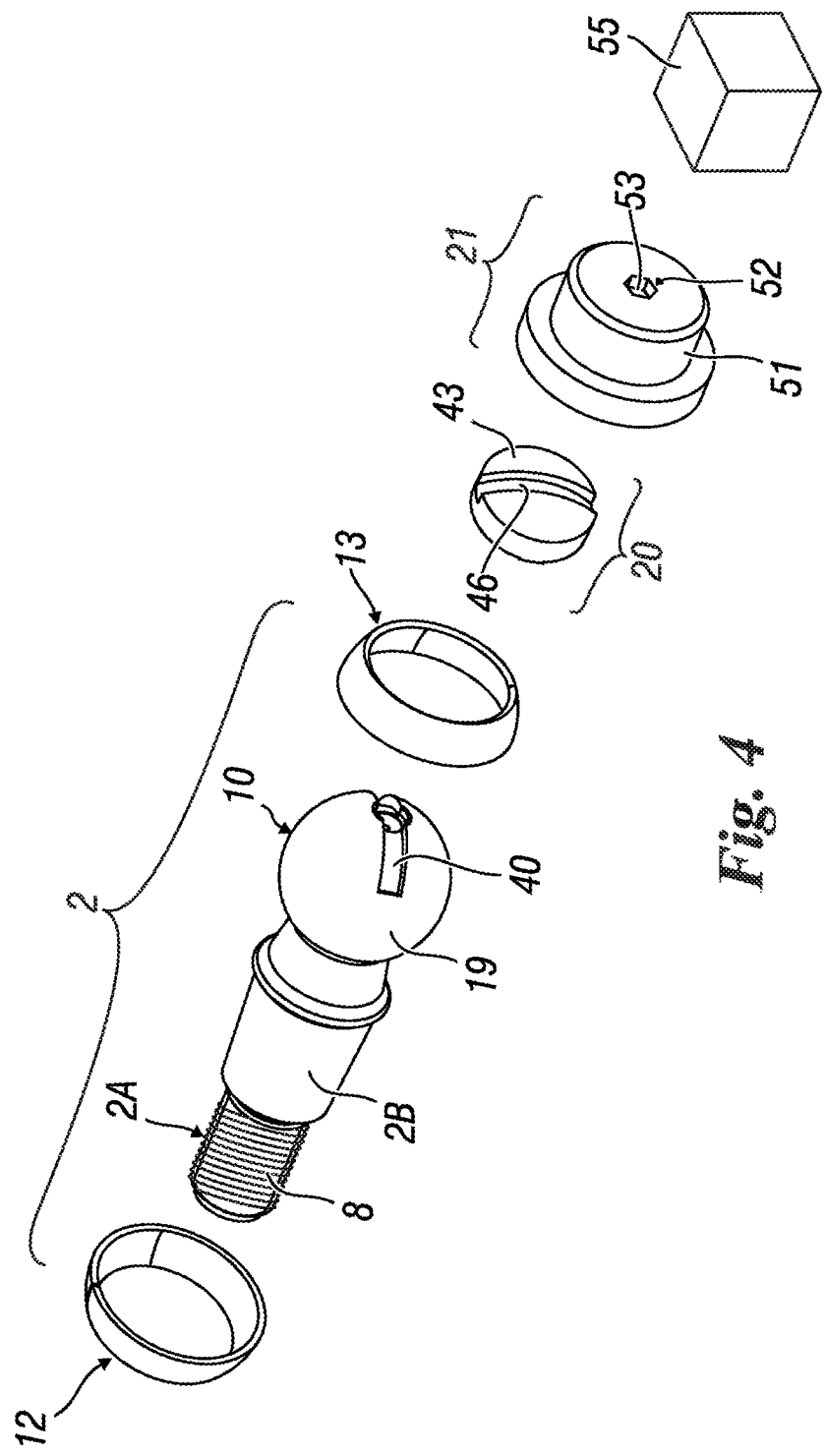
FIG. 4 shows a partial and simplified perspective view from another side of the joint of FIG. 1.
Figure 5:
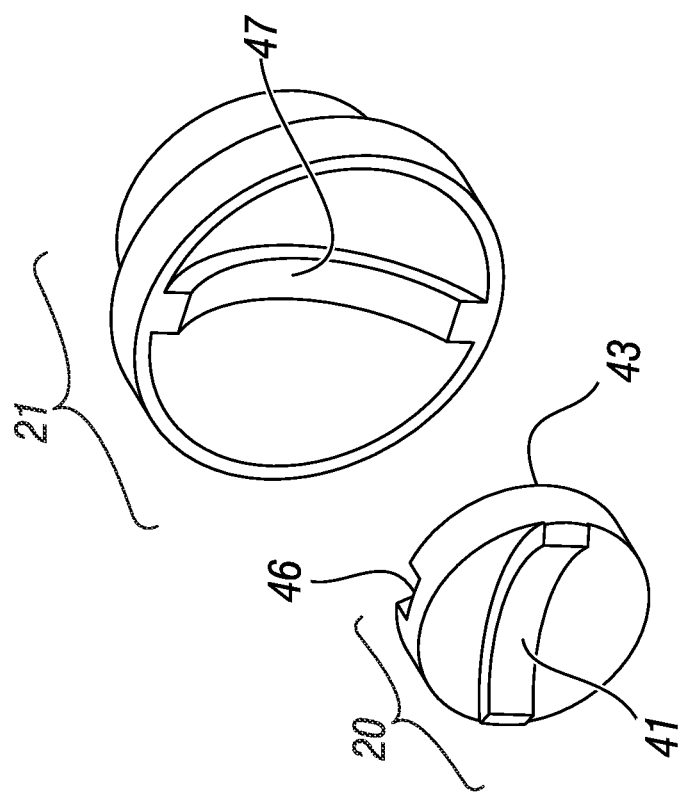
FIG. 5 shows an enlarged perspective view of a section identified by the letter A in FIG. 1.

Finally, a section 51 of the second shell 21 facing towards the closing element 32 is cylindrical to make it possible for the shells, the pin, hence the joint, to rotate around the Z axis only (i.e. the longitudinal axis of the pin). Such section 51 penetrates the opening 56 of the annular closing element 32 up to reaching the end of such closing element; a seat 52 (for example, one having a polygonal wall 53 or a geometrically similar shape in the cross section) is derived in said section 51, suitable for accommodating a movable element (with a shell), such as a magnetic element or a mechanical drive shaft (not shown). Such movable element is suitable for co-operating with an angular sensor or angular encoder 55 of a type that is known by itself (for example, one provided with a drive shaft or a magnetic type one) integral with the body 1, as schematically shown in FIG. 4.

The joint according to the invention is thus able to provide an accurate and continuous control of the position around the Z axis of the pin, thanks to an implementation solution that is simpler and mechanically more reliable and stronger in terms of wear and tear as compared with the known solutions. Also, such joint features dimensions that are almost unchanged with respect to the already existing ball joints used to perform the same mechanical linking function between two component parts of a suspension (however, the latter not being able to measure the angle of rotation), which facilitates its mounting also in mechanical structures of suspensions of vehicles that are already known and marketed.

A particular embodiment of the invention has been described above. However, others are possible: for example, the torsional connection between the spherical end 10 and the first shell 20, and that between the first shell 20 and the second shell 21, can also be obtained in another manner known to those skilled in the art (for example, by reversing grooves and ridges on the component parts with respect to the arrangement described above), while allowing for a rotation around the X axis and the Y axis of the pin respectively.

These solutions are also to be considered as falling within the scope of the present invention.

The invention claimed is:

1. A ball joint comprising a body of the joint wherein there is inserted a pin having a longitudinal axis and including a first end and a second end, said second end having a spherical shape, the second spherical end being rotatably arranged within a seat of said body, wherein a first spherical-cap-shaped element or shell is inserted within a seat having a corresponding shape of a second spherical-cap-shaped element or shell co-operating with a covering element so as to enclose the second spherical end of the pin within said body, the second spherical end of the pin, the first spherical-cap-shaped element or shell and second spherical-cap-shaped element or shell including reciprocal torsional coupling elements, such as to allow for a rotation of the pin about all axes of space in the body, the longitudinal axis of the pin being coincident with one of these axes, an angular displacement sensor being provided suitable for co-operating with a magnetic or mechanical drive element, integral with said second spherical-cap-shaped element or shell, in order to assess the rotation of the pin of the joint around the longitudinal axis of the pin itself, said reciprocal torsional coupling elements comprising pairs of grooves and ridges derived inside and on contact surfaces of the second spherical end of the pin, of the first spherical-cap-shaped element or shell, and of the second spherical-cap-shaped element or shell.

2. The ball joint according to claim 1, wherein the second spherical end of the pin comprises a spherical cap inserted within the first spherical-cap-shaped element or shell, a groove being provided in said spherical cap of the spherical end suitable for co-operating with a ridge provided on a surface of said first spherical-cap-shaped element or shell in a direct contact with the pin.

3. The ball joint according to claim 1, wherein an outer surface of the first spherical-cap-shaped element or shell comprises a groove suitable for receiving a ridge projecting from an inner surface of the second spherical-cap-shaped element or shell in contact with said first spherical-cap-shaped element or shell.

4. The ball joint according to claim 1, wherein the second spherical-cap-shaped element or shell comprises a section facing to the outside of the ball joint having a seat suitable for accommodating a mechanical drive element or magnetic element.

5. The ball joint according to claim 4, wherein said section of the second spherical-cap-shaped element or shell is cylindrical.

6. The ball joint according to claim 5, wherein said cylindrical section is inserted within an opening of the covering element realized in an annular shape.

7. The ball joint according to claim 1, wherein said angular displacement sensor is arranged in correspondence with the covering element.

* * * * *